(12) United States Patent
Khosravi

(10) Patent No.: US 7,805,512 B2
(45) Date of Patent: Sep. 28, 2010

(54) REMOTE CONFIGURATION, PROVISIONING AND/OR UPDATING IN A LAYER TWO AUTHENTICATION NETWORK

(75) Inventor: Hormuzd M. Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 289 days.

(21) Appl. No.: 11/967,139

(22) Filed: Dec. 29, 2007

(65) Prior Publication Data

US 2009/0158409 A1 Jun. 18, 2009

(51) Int. Cl.
*G06F 15/16* (2006.01)
(52) U.S. Cl. .......................... 709/225; 709/220; 726/26
(58) Field of Classification Search .................. 709/225, 709/224, 220–222; 726/2–6, 26–27
See application file for complete search history.

(56) References Cited

U.S. PATENT DOCUMENTS

2005/0235363 A1* 10/2005 Hibbard et al. ............... 726/28
2009/0083844 A1* 3/2009 Eldar et al. .................... 726/11
2009/0132682 A1* 5/2009 Counterman ................ 709/220

OTHER PUBLICATIONS

Check point software and foundary networks demonstrate total access protection at rsa2005, Feb. 16, 2005.*
"Synchronizing Between Host and Management Co-Processor for Network Access Control", assigned U.S. Appl. No. 11/904,322.
Check Point Software, "Check Point . . . Client", Published: Feb. 16, 2005.

* cited by examiner

*Primary Examiner*—Salad Abdullahi
(74) *Attorney, Agent, or Firm*—Cool Patent, P.C.; Joseph P. Curtin

(57) ABSTRACT

A device capable of remote configuration, provisioning and/or updating comprising a network detector capable of detecting a network regardless of the state of the operating system on the device, wherein the network requires layer two authentication, and an Embedded Trust Agent capable of generating an authentication credential for layer two authentication and communicating the authentication credential via a layer two authentication protocol without a functioning operating system.

14 Claims, 2 Drawing Sheets

REMOTE CONFIGURATION, PROVISIONING AND/OR UPDATING IN A LAYER TWO AUTHENTICATION NETWORK

BACKGROUND

Network devices may be remotely updated or configured. In order to receive instructions for remote configuration, provisioning and/or updating, network access must be granted. Network Access Control (NAC) technologies enabling Layer Two Authentication (L2A) may require a device to comply with Information Technology (IT) policies in addition to providing other authentication credentials in order to gain access to a network. This may ensure that unauthorized and non-compliant devices are not allowed to access the network. L2A may allow a network authentication controller to send system updates to a device prior to allowing network access. A particular embodiment of a L2A protocol is embodied in the Institute of Electrical and Electronics Engineers (IEEE) 802.1x standard for port-based Access Control.

FIG. 1 illustrates a particular embodiment of an IEEE 802.1x compliant network 100. Network 100 may comprise supplicant 102, a device seeking access to network resources via authenticator 106. In a particular embodiment, authenticator 106 may pass incoming requests on to authentication server 110 for processing. According to a particular embodiment, supplicant 102 may authenticate with authentication server 110 through authenticator 106. According to a particular embodiment, authenticator 106 may enforce authentication, however, authenticator 106 may not need to provide the authentication. Instead, authenticator 106 may exchange authentication traffic between supplicant 102 and authentication server 110. IEEE 802.1x provides a framework to transmit authentication information between authenticator 106 and supplicant 102 by defining a standard for communicating Extensible Authentication Protocol Over Local Area networks (EAPOL).

DETAILED DESCRIPTION

Figure 1:
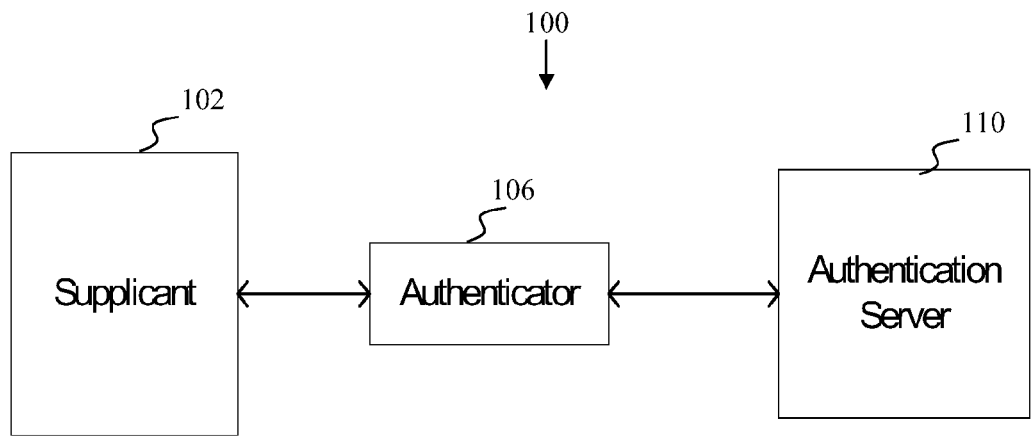
FIG. 1 is a block diagram illustrating a particular embodiment of a Layer Two Authentication network.

In the following detailed description, numerous specific details are set forth in order to provide a thorough understanding of claimed subject matter. However, it will be understood by those skilled in the art that claimed subject matter may be practiced without these specific details. In other instances, well-known methods, procedures, and components have not been described in detail so as not to obscure claimed subject matter.

The term 'supplicant' is used throughout the following disclosure and is intended to refer to a device seeking access to a network. The term 'authenticator' is used throughout the following disclosure and is intended to refer to a device that may require authentication from the supplicant. The term 'authentication server' is used throughout the following disclosure and is intended to refer to an entity that provides an authentication service to an authenticator. This service may verify, from the credentials provided by a supplicant, the claim of identity made by a supplicant. The term 'network' is used throughout the following disclosure and is intended to refer to an interconnected group or system of electronic devices. The term 'Layer Two' is used throughout the following disclosure and is intended to refer to the second or 'Data Link Layer' of the five layer Transport Control Protocol/Internet Protocol (TCP/IP) model. Layer Two may transfer data between adjacent network nodes in a wide area network or between nodes on the same local area network segment. The term 'firmware' is used throughout the following disclosure and is intended to refer to a computer program embedded in a hardware device. The term 'authentication credentials' is used throughout the following disclosure and is intended to refer to a data set such as certificates, credentials, user names, passwords and/or device posture used to authenticate the identity of a device. The term 'certificate' is used throughout the following disclosure and is intended to refer to an electronic document which incorporates a digital signature and may be used to authenticate the identity of a device. The term 'self-signed certificate' is used throughout the following disclosure and is intended to refer to a digital certificate signed by the owner or device that generates the digital certificate. The term 'Extensible Authentication Protocol' (EAP) is used throughout the following disclosure and is intended to refer to a protocol that provides a framework and transport for authentication protocols. The term 'EAP Over local area network (LAN)' (EAPOL) is used throughout the following disclosure and is intended to refer to EAP used on packet networks such as wired and wireless LAN. The term 'Trusted Root Certificate' is used throughout the following disclosure and is intended to refer to a root certificate issued by a known certificate authority, such as, Verisign, Inc.©, RapidSSL® or Thwate™. The term 'posture credential' is used throughout the following disclosure and is intended to refer to information related to attributes possessed by a device that is seeking access to the network. Such attributes may be device-type, operating system (OS), variety of security applications and other software information. The terms 'snoop' and 'snooping' are used throughout the following disclosure and are intended to refer to an action performed by a processor such as a network detector wherein the processor monitors a communication channel.

For the sake of clarity, the IEEE 802.1x standard is used throughout the disclosure as an example of a L2A network. However, the following disclosure relates to a method and apparatus compatible with any L2A network or protocol, such as, a variety of EAP methods including for example; Protected Extensible Authentication Protocol (PEAP), Light Extensible Authentication Protocol (LEAP), and Extensible Authentication Protocol-Flexible Authentication via Secure Tunneling (EAP-FAST) and claimed subject matter is not limited in this regard.

Figure 2:
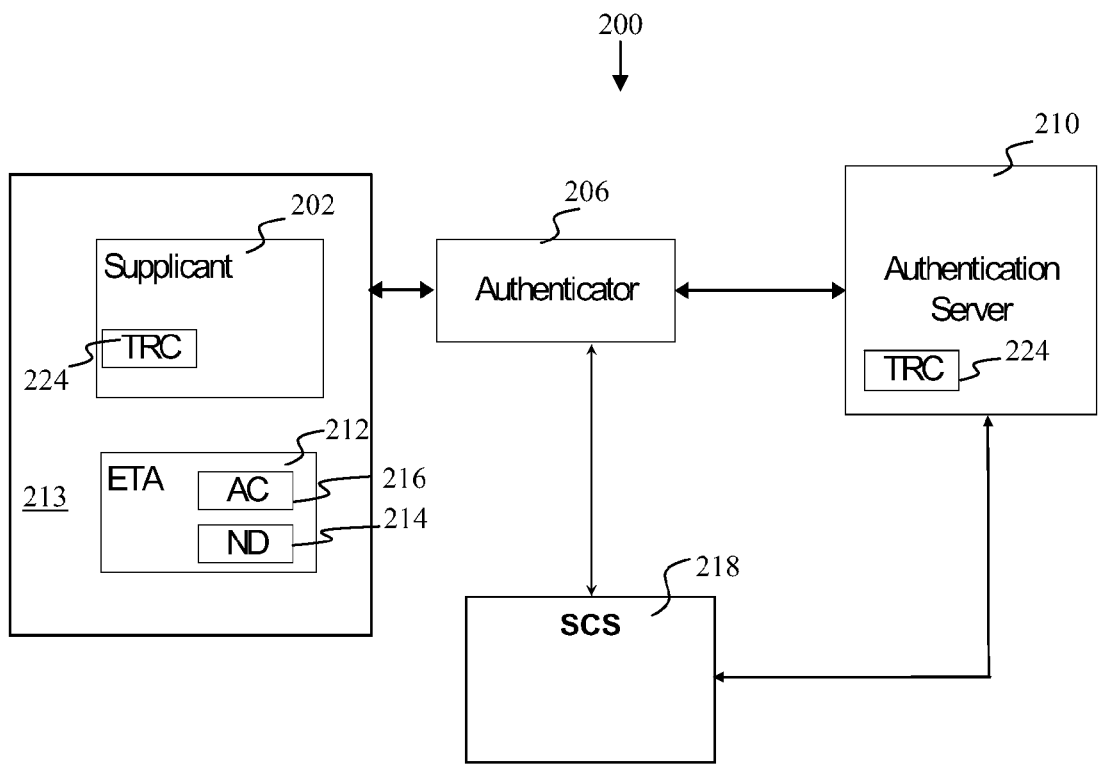
FIG. 2 is a block diagram illustrating a particular embodiment of a Layer Two Authentication network.

FIG. 2 is a block diagram illustrating a particular embodiment of an L2A network 200 conforming to the IEEE 802.1x standard. Network 200 may comprise authenticator 206 and authentication server 210. In a particular embodiment, authenticator 206 may comprise a variety of devices such as a switch and/or network Access Device (NAD) and claimed subject matter is not limited in this regard. According to a particular embodiment, authentication server 210 may comprise a variety of server devices, such as, an Authentication Authorization Accounting (AAA) server, Remote Authentication Dial In User Service (RADIUS) Server and/or Policy Decision Point (PDP) Server and claimed subject matter is not limited in this regard.

In a particular embodiment, supplicant 202 may comprise a client device making a control channel connection request to gain access to network 200 in order to remotely configure and/or update supplicant 202 system. In a particular embodiment, supplicant 202 may seek to remotely provision, configure and/or update a variety of systems and/or software, such as, for instance, configuring system BIOS and/or updating the OS. In a particular embodiment, supplicant 202 may comprise a variety of platforms, such as, for instance, Intel® AMT vPro and/or Intel® AMT Centrino Pro platforms, other operating system platforms and claimed subject matter is not limited in this respect.

According to a particular embodiment, platform 213 may comprise an Embedded Trust Agent (ETA) 212. In a particular embodiment, ETA 212 may run on a separate control or management co-processor on platform 213 and may be independent of a main processor and operating system on platform 213. In a particular embodiment ETA 212 may be available even when the OS and supplicant 202 are not available. In a particular embodiment, ETA 212 may be embedded in platform 213 firmware. According to a particular embodiment ETA 212 may further comprise network detector 214 capable of determining whether network 200 is an L2A network by detecting the presence of L2A network compliant, signals, messages and/or requests. In a particular embodiment, network detector 214 may detect that network 200 is an IEEE 802.1x compliant network by sending out EAPOL Start packets and detecting EAPOL Request packets. In a particular embodiment, functionality of network detector 214 may be activated by default in supplicant 202 firmware. According to a particular embodiment, ETA 212 may be capable of communicating with network 200 devices using an appropriate L2A protocol such as IEEE 802.1x. However, these are merely examples of methods of detecting the presence of an L2A network and communicating with an L2A network and claimed subject matter is not so limited. Further description of ETA 212 is provided in co-pending U.S. patent application Ser. No. 11/904,322, filed Sep. 26, 2007, having at least one common inventor, Hormuzd Khosravi, assigned to the assignee of the present application and titled "SYNCHRONIZING BETWEEN HOST AND MANAGEMENT CO-PROCESSOR FOR NETWORK ACCESS CONTROL." Co-pending U.S. patent application Ser. No. 11/904,322 is hereby incorporated by reference in its entirety.

In a conventional L2A network, supplicant 202 may initiate a network connection to authenticator 206. Thereafter, supplicant 202 may be redirected to authentication server 210 which may be equipped to make authorization decisions on network access based on an administrative or IT policy. As part of this control protocol, information such as device identity and state may be conveyed by supplicant 202, allowing the authentication server 210 to make an informed decision on allowing the client to access a given network. Once a decision is made, it is typically conveyed to authenticator 206, which may control whether and how the client device is allowed to access the L2A network. In contrast, according to a particular embodiment, ETA 212 may be capable of providing authentication credentials 216 to authenticator 206 to gain access to network 200 without accessing supplicant 202 systems. In this way ETA 212 acts independently of supplicant 202 to gain access to network 200. Accordingly, ETA 212 may be capable of providing authorization credentials 216 enabling itself and supplicant 202 to gain access to network 200 even if OS of supplicant 202 is not running, for instance if the OS has crashed or there is an event that causes supplicant 202 system to be inaccessible.

In a particular embodiment, authentication credentials 216 generated by ETA 212 may comprise a self-signed certificate for supplicant 202. Such a self-signed certificate may be based on network 200 Trusted Root Certificates 224 programmed into supplicant 202 firmware. In a particular embodiment, ETA 212 may communicate a self-signed client certificate as authentication credentials 216 to authenticator 206 to gain access to network 200 using an appropriate Extensible Authentication Protocol (EAP) method. Authentication server 210 may be configured by default with network 200 Trusted Root Certificates 224 enabling authentication server 210 and/or authenticator 206 to authenticate supplicant 202 based on authentication credentials 216 in the form of a self-signed certificate. Additionally, ETA 212 may provide other information to authenticator 206 such as supplicant 202 posture credentials. Thereafter, authentication server 210 may authenticate supplicant 202 to network 200 assigning an Internet Protocol (IP) address to supplicant 202.

In another particular embodiment, ETA 212 may generate authentication credentials 216 comprising default credentials and/or a default user identification and password. According to a particular embodiment, ETA 212 may communicate authentication credentials 216 to authenticator 206 using an appropriate L2A protocol such as, for instance, EAP. According to a particular embodiment, authenticating server 210 may be configured to recognize authentication credentials 216 in the form of default credentials and/or a default user identification and password enabling authenticating server 210 and/or authenticator 206 to authenticate supplicant 202 based on authentication credentials 216 in the form of default credentials and/or a default user identification and password. Thereafter, authentication server 210 and/or authenticator 206 may authenticate ETA 212 to network 200 assigning ETA 212 an Internet Protocol (IP) address.

In a particular embodiment, network 200 may comprise Setup and Configuration Server (SCS) 218. According to a particular embodiment, SCS 218 may be capable of providing Setup and Configuration parameters to supplicant 202. In a particular embodiment, Setup and Configuration is a process that may make program features in supplicant 202 accessible. According to a particular embodiment, supplicant 202 may be delivered to a customer in an unconfigured state. In order to allow applications on supplicant 202 to be accessible, supplicant 202 may need to be populated with various configuration settings such as usernames, passwords, network parameters, Transport Layer Security (TLS) certificates, and keys necessary for secure communications. If ETA 212 receives authorization and is granted access to network 200, supplicant 202 may proceed with remote configuration, provisioning and/or updating of supplicant 202 system(s). For instance, in a particular embodiment, supplicant 202 may be an Intel® AMT/vPro platform capable of Zero Touch Provisioning (ZTP) as an example. ZTP may comprise a configuration system capable of initiating provisioning supplicant 202 substantially without user intervention. In a particular embodiment, providing such ZTP may be enabled by ETA 212 providing authorization credentials 216 enabling supplicant 202 to gain access to network 200.

After connecting to network 200, a connection may be established between Setup and Configuration Server (SCS) 218 and supplicant 202. In a particular embodiment, SCS 218 then may log into supplicant 202 and proceed with configuration, provisioning and/or updating without an user intervention. In a particular embodiment, ETA 212 may also be provisioned, configured and/or updated with updated authentication information, credentials and/or certificates for future authentication. In a particular embodiment, before, after and/or during configuration, provisioning and/or updating, SCS 218 may provision ETA 212 for generation of altered authentication credentials 216 and/or generation of a second set of authentication credentials by ETA 212. In a particular embodiment, authentication credentials 216 may be destroyed during configuration, provisioning and/or updating.

Figure 3:
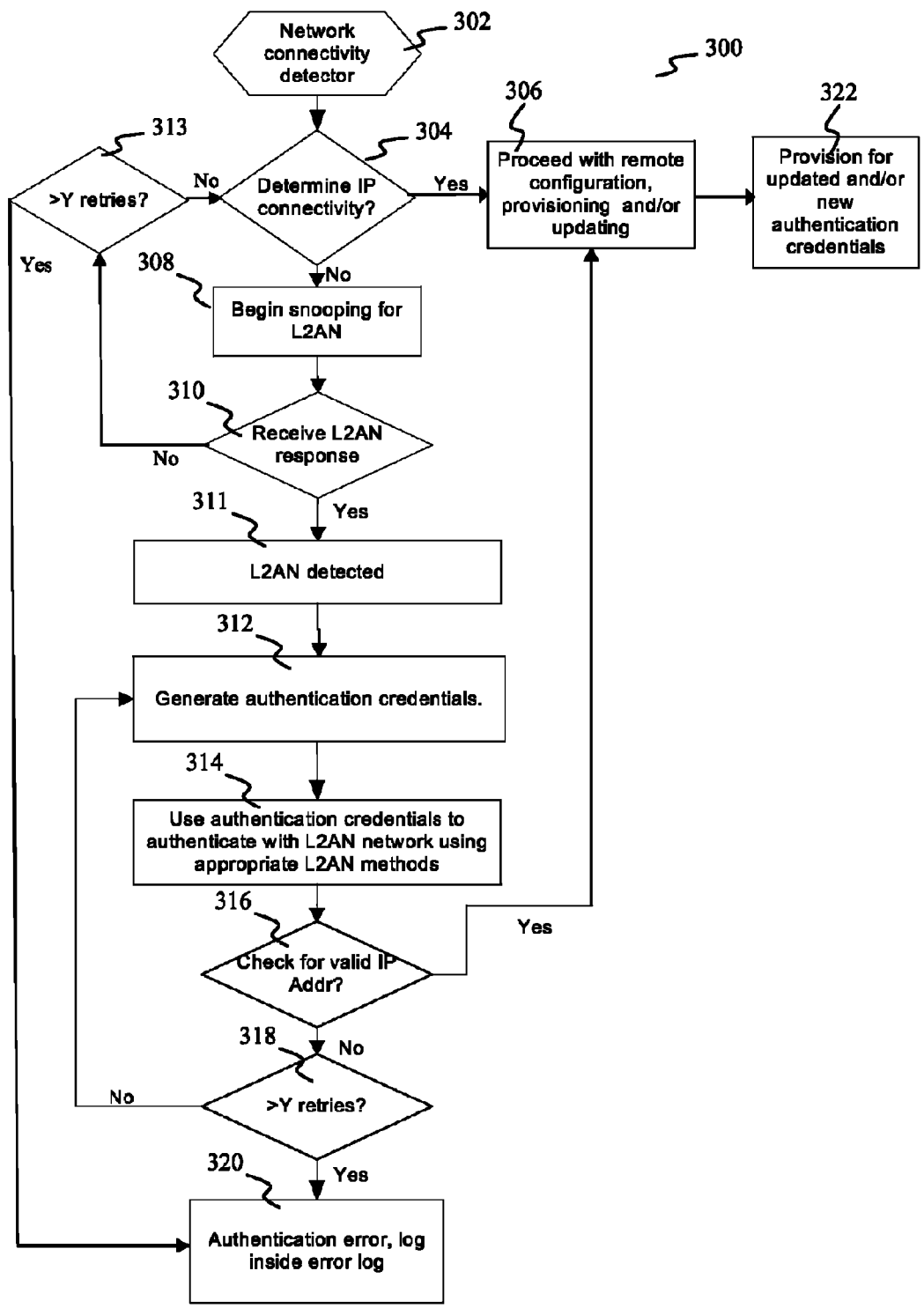
FIG. 3 is a flow diagram illustrating a particular embodiment of a Layer Two Authentication process.

FIG. 3 is a flow diagram illustrating a particular embodiment of a process 300 for remote configuration, provisioning and/or updating in a L2A network. At block 302, network detector 214 of ETA 212 (referring to FIG. 2) is activated either by default or by a variety of triggering events such as routine system maintenance, user defined triggers and/or detection of a security threat and claimed subject matter is not limited in this regard.

In a particular embodiment, at block 304 network detector 214 may determine whether supplicant 202 (referring again to FIG. 2) has IP connectivity. In a particular embodiment, to determine whether supplicant 202 has IP connectivity, network detector 214 may check Address Resolution Protocol (ARP) tables for a valid IP Address, or IP connectivity may be verified by another method such as checking for a timestamp in an ARP table and claimed subject matter is not limited in this regard.

In a particular embodiment, if supplicant 202 is determined to have IP connectivity, the process may flow to block 306. At block 306, configuration, provisioning and/or updating of supplicant 202 system may proceed. However, after time interval X, if supplicant 202 is not determined to have IP connectivity the process may flow to block 308.

In a particular embodiment, at block 308, network detector 214 may begin determining whether supplicant 202 is seeking access to a L2A network (L2AN in FIG. 3) by snooping for 802.1x/EAP packets. In a particular embodiment, network detector 214 may begin actively sending out EAPOL Start packets to determine if it is in an L2A network such as an IEEE 802.1x network. In a particular embodiment, process 300 may flow to block 310 where ETA 212 may receive a L2A network response, such as, an 802.1x EAPOL Request packet. Receiving an L2A network response may confirm that supplicant 202 is seeking access to a L2A network such as an 802.1x network and process 300 may flow to block 311 indicating that a L2A network has been detected. After a time x, if no L2A network is detected, process 300 may flow back to block 304 through block 313. In a particular embodiment, the threshold number of retries may be predetermined and if retries exceed a threshold Y at block 313, process 300 may flow to block 320 where an authentication error may be logged. However, these are merely examples of methods of determining whether a supplicant is seeking access to a L2A network and claimed subject matter is not limited in this regard.

In a particular embodiment, from block 311, process 300 may flow to block 312 where ETA 212 may generate authentication credentials. Such authentication credentials may comprise a self-signed certificate based at least in part on a Trusted Root Certificate 224 (referring to FIG. 2) wherein said Trusted Root Certificate 224 is known to at least one device on the network, a username and password wherein the user name and password are known to at least one device on the network, and/or posture credentials wherein the posture credentials are known to at least one device on the network.

In a particular embodiment, process 300 may flow to block 314 where ETA 212 may use authentication credentials to authenticate with L2A network by sending credentials to authenticator 206 (referring to FIG. 2) using an appropriate L2A protocol. In a particular embodiment, such L2A protocol may be, for instance sending credentials via EAPOL, in an IEEE 802.1x compliant protocol. However, this is merely an example of an appropriate L2A protocol and claimed subject matter is not so limited.

In a particular embodiment, process 300 may flow to block 316 where ETA 212 may check for a valid IP address. If a valid IP address is detected, a network connection may be made and process 300 may flow to block 306 where configuration, provisioning and/or updating of supplicant 202 system may proceed. Such configuration, provisioning and/or updating may include configuration, provisioning and/or updating of ETA 212. After configuration, provisioning and/or updating, process 300 may flow to block 322. In a particular embodiment, at block 322 authentication credentials may be destroyed. However, in other embodiments authentication credentials may be destroyed before or during configuration, provisioning and/or updating or may not be destroyed and claimed subject matter is not limited in this regard.

According to a particular embodiment, at block 316, if a valid IP address is not detected, process 300 may flow through block 318 back to block 312 and again through blocks 314 and 316. In a particular embodiment, the number of retries may be predetermined and if retries exceed a threshold Y at block 318, process 300 may flow to block 320 where an authentication error may be logged. However, this is merely an example of a process for validating an IP address and making a network connection and claimed subject matter is not limited in this regard.

While certain features of claimed subject matter have been illustrated as described herein, many modifications, substitutions, changes and equivalents will now occur to those skilled in the art. It is, therefore, to be understood that the appended claims are intended to cover all such embodiments and changes as fall within the spirit of claimed subject matter.

What is claimed is:

1. A method, comprising:
determining at a device coupled to a network whether remote configuration, provisioning or updating or combinations thereof of the device requires the device to access a network wherein the network requires layer two authentication; generating a first authentication credential for layer two authentication via an embedded agent associated with the device wherein the first authentication credential comprises: a self-signed certificate based at least in part on a Trusted Root Certificate wherein said Trusted Root Certificate is known to at least one device on the network, a username and password wherein the user name and password are known to at least one device on the network, or posture credentials wherein the posture credentials are known to at least one device on the network, or combinations thereof;

accessing the network by the device wherein accessing comprises authenticating to the network using the first authentication credential; and proceeding with remote configuration, provisioning or updating, or combinations thereof of the device, and wherein such remote configuration, provisioning or updating occurs substantially without any user intervention.

2. The method of claim 1 wherein determining at a device coupled to a network further comprises; detecting network connectivity is not available via Internet Protocol (IP) connectivity; snooping signals to determine whether network is layer two authentication network;
confirming network is layer two authentication network based at least in part on snooped signals.

3. The method of claim 2, wherein snooping comprises sending an Extensible Authentication Packet Over Land (EAPOL) Start packet to the network and wherein confirming comprises receiving Extensible Authentication Packet (EAP) Request packet from the network.

4. The method of claim 1, wherein the layer two authentication network is an Institute of Electrical and Electronics Engineers (IEEE) 802. 1x compliant network.

5. The method of claim 1 wherein configuration, provisioning or updating, or combinations thereof further comprises receiving updates for generation of an altered first authentication credential.

6. The method of claim 1 wherein configuration, provisioning or updating, or combinations thereof further comprises receiving updates for generation of a second authentication credential.

7. An apparatus comprising:
- a device capable of remote configuration, provisioning or updating, or combinations thereof, the device comprising;
- a network detector capable of detecting a network, wherein the network requires layer two authentication; and
- an Embedded Trust Agent (ETA) capable of;
- generating a first authentication credential for layer two authentication;
- communicating the authentication credential via a layer two authentication protocol; and
- functioning whether or not an associated operating system is running.

8. The apparatus of claim 7 wherein the network detector is further capable of; detecting if network connectivity is available via Internet Protocol (IP) connectivity; snooping signals to determine whether network is layer two authentication network; and confirming network is layer two authentication network based at least in part on snooped signals.

9. The apparatus of claim 8 wherein the device is capable of remote configuration, provisioning or updating, or combinations thereof, substantially without user intervention.

10. The apparatus of claim 7, wherein the network is an Institute of Electrical and Electronics Engineers (IEEE) 802.1 x compliant network.

11. The apparatus of claim 7, wherein snooping comprises sending an Extensible Authentication Packet Over Land (EAPOL) Start packet to the network and wherein confirming comprises receiving Extensible Authentication Packet (EAP) Request packet from the network.

12. The apparatus of claim 7 wherein the ETA is further capable of being provisioned, configured or updated, or combinations thereof substantially without any user intervention.

13. The apparatus of claim 12 wherein the ETA is further capable of generating a second authentication credential based at least in part on information received during provisioning, configuring or updating, or combinations thereof.

14. The apparatus of claim 12 wherein the ETA resides on the device in an embedded co-processor.

* * * * *